(12) United States Patent
Dong et al.

(10) Patent No.: US 10,491,550 B2
(45) Date of Patent: Nov. 26, 2019

(54) INSTANT COMMUNICATION

(71) Applicant: Alibaba Group Holding Limited, Grand Cayman (KY)

(72) Inventors: Guangqian Dong, Hangzhou (CN); Hang Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 315 days.

(21) Appl. No.: 15/153,638

(22) Filed: May 12, 2016

(65) Prior Publication Data
US 2016/0337277 A1    Nov. 17, 2016

(30) Foreign Application Priority Data

May 14, 2015    (CN) .......................... 2015 1 0244566

(51) Int. Cl.
*H04L 12/58* (2006.01)

(52) U.S. Cl.
CPC ............ *H04L 51/046* (2013.01); *H04L 51/04* (2013.01); *H04L 51/22* (2013.01); *H04L 51/36* (2013.01)

(58) Field of Classification Search
None
See application file for complete search history.

(56) References Cited

U.S. PATENT DOCUMENTS 6,832,244 B1 * 12/2004 Raghunandan ......... H04L 51/14
                                                    709/206
6,912,564 B1 *  6/2005 Appelman ............... H04L 51/04
                                                    709/204

(Continued)

FOREIGN PATENT DOCUMENTS

| CN | 102025514 | 4/2011 |
|---|---|---|
| CN | 103457833 | 12/2013 |
| CN | 104184647 | 12/2014 |

OTHER PUBLICATIONS

PCT Search Report and Written Opinion dated Aug. 19, 2016 for PCT Application No. PCT/US16/32210, 10 pages.

(Continued)

*Primary Examiner* — Backhean Tiv
(74) *Attorney, Agent, or Firm* — Lee & Hayes, P.C.

(57) ABSTRACT

An instant communication method includes: acquiring a first keyword; acquiring a mail index list of mails that contain the first keyword; determining at least one mail index from the mail index list; extracting predetermined information from one or more mails that corresponds to the determined mail index; encapsulating the predetermined information into an instant communication message; and sending the instant communication message to a predetermined communication terminal. A client terminal that performs instant communication has a session interface, and a predetermined button is provided on the session interface; and a step of initiating a mail retrieval command includes triggering the predetermined button to generate a mail retrieval command. The instant communication method and the client terminal that are provided by the present disclosure may reduce the operational complexity for the user when needing to send a mail during instant communication, thereby improving user experience and satisfaction.

20 Claims, 5 Drawing Sheets

(56) References Cited

U.S. PATENT DOCUMENTS

| | | | | |
|---|---|---|---|---|
| 7,080,154 | B1* | 7/2006 | Inoue | H04M 7/0015 379/93.01 |
| 7,444,328 | B2* | 10/2008 | Starbuck | G06Q 10/107 |
| 7,895,273 | B1* | 2/2011 | Haldar | G06Q 10/10 370/229 |
| 8,041,770 | B1* | 10/2011 | Schmidt | G10L 19/20 709/206 |
| 2001/0011232 | A1* | 8/2001 | Peterson | G06Q 10/08 705/26.1 |
| 2001/0047305 | A1* | 11/2001 | Bowen, Jr. | G06Q 10/087 705/27.1 |
| 2002/0101446 | A1* | 8/2002 | Tang | G06Q 10/10 715/751 |
| 2002/0103867 | A1* | 8/2002 | Schilter | G06Q 10/107 709/206 |
| 2003/0093814 | A1* | 5/2003 | Birmingham | H04N 7/17318 725/136 |
| 2003/0187668 | A1* | 10/2003 | Ullmann | G06F 16/9562 705/1.1 |
| 2004/0078216 | A1* | 4/2004 | Toto | G16H 10/60 705/2 |
| 2004/0138903 | A1* | 7/2004 | Zuniga | G06Q 10/06398 705/321 |
| 2004/0154022 | A1* | 8/2004 | Boss | G06Q 10/107 719/310 |
| 2004/0158612 | A1* | 8/2004 | Concannon | H04L 29/06 709/206 |
| 2004/0179035 | A1* | 9/2004 | Ullmann | G06F 16/954 715/745 |
| 2004/0249801 | A1* | 12/2004 | Kapur | G06F 16/951 |
| 2005/0013426 | A1* | 1/2005 | Ooki | H04M 3/54 379/211.02 |
| 2005/0027695 | A1* | 2/2005 | John | G06Q 10/107 |
| 2005/0144162 | A1 | 6/2005 | Liang | |
| 2005/0182773 | A1* | 8/2005 | Feinsmith | G06Q 10/10 |
| 2005/0188076 | A1* | 8/2005 | Rayburn | H04L 12/2803 709/224 |
| 2005/0198147 | A1* | 9/2005 | Pastro | H04L 51/04 709/206 |
| 2006/0074883 | A1* | 4/2006 | Teevan | G06F 16/9535 |
| 2006/0168026 | A1* | 7/2006 | Keohane | H04L 51/04 709/206 |
| 2006/0168315 | A1* | 7/2006 | Daniell | G06Q 10/107 709/237 |
| 2006/0277210 | A1* | 12/2006 | Starbuck | G06Q 10/107 |
| 2007/0005701 | A1* | 1/2007 | Barsness | H04L 51/04 709/205 |
| 2007/0150368 | A1* | 6/2007 | Arora | G06Q 30/02 705/26.1 |
| 2007/0233785 | A1* | 10/2007 | Abraham | G06Q 10/107 709/204 |
| 2008/0033970 | A1* | 2/2008 | Jones | G06F 16/9535 |
| 2008/0037582 | A1* | 2/2008 | Wang | G06O 10/107 370/466 |
| 2008/0037721 | A1* | 2/2008 | Yao | G06Q 10/107 379/88.11 |
| 2008/0114758 | A1* | 5/2008 | Rupp | G06F 16/9535 |
| 2008/0129469 | A1* | 6/2008 | Sumner | G06Q 10/107 340/313 |
| 2008/0170674 | A1* | 7/2008 | Ozden | G06Q 10/107 379/93.24 |
| 2008/0285587 | A1* | 11/2008 | Balk | G06Q 10/107 370/466 |
| 2009/0013265 | A1* | 1/2009 | Cole | H04L 51/04 715/758 |
| 2009/0129372 | A1* | 5/2009 | Pandey | G06Q 30/0267 370/352 |
| 2009/0319918 | A1* | 12/2009 | Affronti | G06F 3/038 715/753 |
| 2010/0250693 | A1* | 9/2010 | Zheng | G06Q 10/10 709/206 |
| 2011/0320277 | A1* | 12/2011 | Isaacs | G06Q 30/02 705/14.55 |
| 2012/0191787 | A1* | 7/2012 | Huang | H04L 29/12613 709/206 |
| 2014/0052805 | A1* | 2/2014 | Yanase | H04L 51/30 709/206 |
| 2016/0337277 | A1* | 11/2016 | Dong | H04L 51/36 |

OTHER PUBLICATIONS

Translation of Chinese Search Report from corresponding Chinese Patent Application No. 2015102445663, dated Nov. 5, 2018, 8 pages.

Translation of Chinese Search Report from corresponding Chinese Patent Application No. 2015102445663, dated Oct. 26, 2018, 1 pages.

* cited by examiner

INSTANT COMMUNICATION

CROSS REFERENCE TO RELATED APPLICATION

The present disclosure claims the benefit of Chinese Patent Application Number 201510244566.3 filed May 14, 2015, entitled "INSTANT COMMUNICATION METHOD AND CLIENT TERMINAL" which is hereby incorporated by reference in its entirety.

TECHNICAL FIELD

The present disclosure relates to the field of communication, and, more particularly, to an instant communication method and a client terminal.

BACKGROUND

Instant communication or instant message (IM) technologies may achieve real-time online communication, and are being more widely used in entertainment, chatting, and e-commerce. In the instant communication technologies, generally a client terminal is used to implement real-time online interactions of a user. When the user sends information by using the client terminal, the user usually needs to open a dialogue window on the client terminal to enter an instant communication message to be sent and display interaction information from the opposite side.

The instant communication technologies, though having good communication flexibility and timeliness, have defects in some aspects. For example, in terms of content of instant communication, it is inconvenient to search history messages, and it is difficult to group together content about a same matter. Therefore, instant communication software needs to be used in combination with email in daily work. Formal or important content is mostly transmitted to users of interest via email. However, when discussing a certain topic, a user tends to use instant communication, which makes the communication more rapid, smooth, and flexible. In some cases, a user that uses instant communication software for communication needs to introduce a mail as content of communication, and first of all, the user on the opposite side needs to read the mail. In the conventional techniques, the user needs to open an email box, find the target mail, and then send the target mail to the user on the opposite side, and no further communication may be carried out before the user on the opposite side acknowledges receipt of the target mail. It is apparent that the operations in the conventional techniques are rather complex, making it inconvenient for the users to communicate with each other.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of example embodiments of the present disclosure is to provide an instant communication method and a client terminal to reduce the operational complexity for the user when needing to send a mail during instant communication, thereby improving user experience and satisfaction.

To solve the above technical problem, the present disclosure provides an instant communication method, which includes: acquiring a first keyword; acquiring a mail index list of mails that contain the first keyword; determining at least one mail index from the mail index list; extracting predetermined information from one or more mails that corresponds to the determined mail index; encapsulating the predetermined information into an instant communication message; and sending the instant communication message to a predetermined communication terminal.

The present disclosure further provides a client terminal, which includes: a keyword acquisition module that acquires a first keyword; a mail acquisition module that acquires a mail index list of mails that contain the first keyword; a mail determination module that determines at least one mail index from the mail index list; an information extraction module that extracts predetermined information from one or more mails that corresponds to the determined mail index; an information encapsulation module that encapsulates the predetermined information into an instant communication message; and an information sending module that sends the instant communication message to a predetermined communication terminal.

As shown from the above technical solutions provided by the present disclosure that, according to the instant communication method provided by the present disclosure, a user may directly use a client terminal that performs instant communication to initiate a mail retrieval command to acquire a required mail, and then send the required mail to a target user by using an instant communication message. In this way, the entire mail sending process is carried out in a client terminal that performs instant communication, so that the user does not need to log in to a web page mail box or a mail box client terminal to perform complex operations, thereby improving user operations, optimizing user experience, and improving user satisfaction.

BRIEF DESCRIPTION OF THE DRAWINGS

To describe the technical solutions in the example embodiments of the present disclosure more clearly, the drawings that need to be used in the example embodiments are briefly introduced herein. It would be apparent that the drawings in the following description are merely some example embodiments of the present disclosure, and those of ordinary skill in the art may further obtain other drawings according to these drawings without creative efforts.

DETAILED DESCRIPTION

To enable those skilled in the art to better understand the technical solutions of the present disclosure, the technical solutions in the example embodiments of the present disclosure will be described below with reference to the accompanying drawings. It is apparent that the described example embodiments merely represent some and not all embodiments of the present disclosure. All other example embodiments obtained by those of ordinary skill in the art based on the example embodiments of the present disclosure without creative efforts shall fall within the protection scope of the present disclosure.

Figure 1:
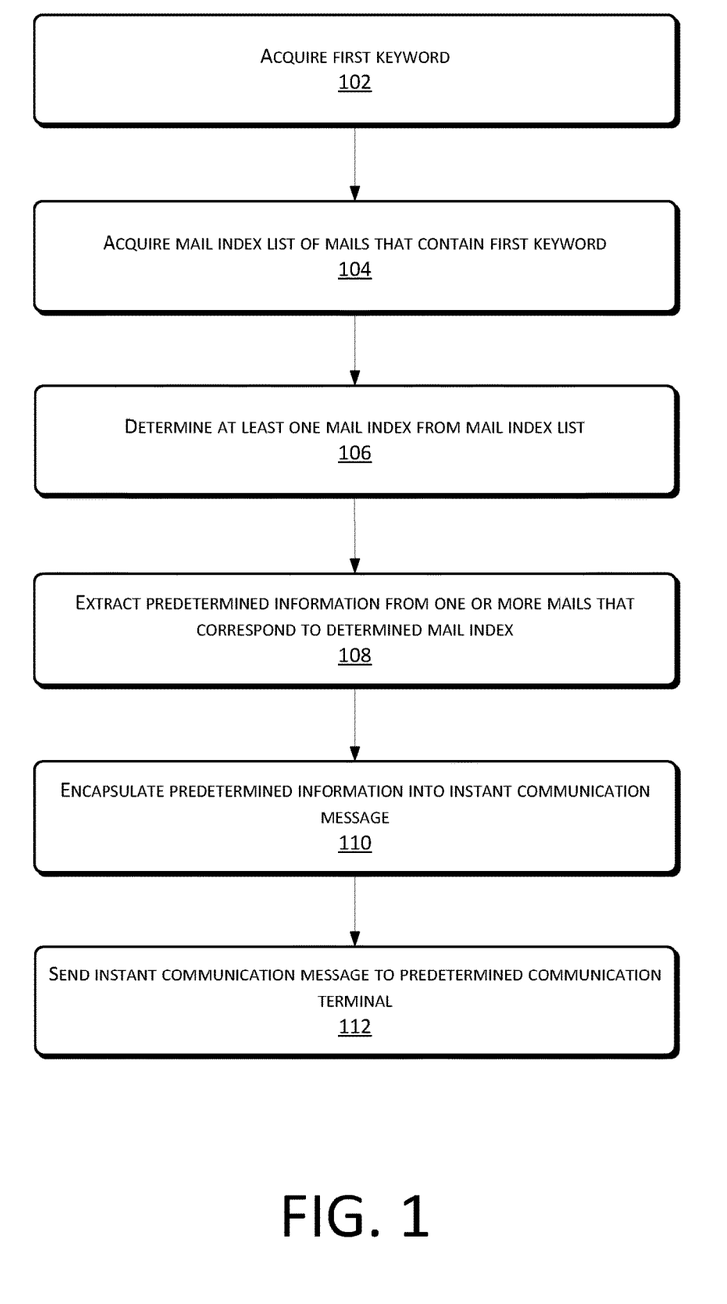
FIG. 1 is a flowchart of an instant communication method according to an example embodiment of the present disclosure.

Referring to FIG. 1, an instant communication method is provided according to one example embodiment of the present disclosure, which includes the following operations:

At 102, a first keyword is acquired.

In this example embodiment, when instant communication is performed, a session interface may be established to start instant information interaction. That is, instant communication messages of a current user and a user on the opposite side is presented on the session interface. A predetermined button may be set on the session interface. When a click event occurs on the predetermined button is detected, the click event is used as a start event for acquiring a first keyword. To improve user experience during conversation, the predetermined button may be set in a secondary menu of the session interface, and may be invoked by the user when the user needs to introduce a mail. For example, a secondary menu opening button is provided on the session interface of the client terminal that performs instant communication, and when the user touches or clicks the secondary menu opening button, the secondary menu is opened to present the predetermined button, so that the user may perform an operation of triggering the predetermined button.

In this example embodiment, the first keyword may be an identity identifier or may be any information that is set by the current user. For example, the first keyword may be a keyword of content of the mail to be sent, the date of reception of the mail, etc., and the present disclosure does not impose any restriction. Certainly, the first keyword may be manually entered or selected by the current user. For example, after the current user triggers the predetermined button, the client terminal that performs instant communication provides an input box on the current session interface for the current user to enter the first keyword. Alternatively, the client terminal that performs instant communication presents a plurality of first keywords on the current session interface for the current user to select manually. Alternatively, an identity identifier of an opposite side member in a current session may be directly used as the first keyword. For instance, the identity identifier may uniquely identify one user. The identity identifier may be an email box account number of the user.

At 104, a mail index list of mails that contain the first keyword is acquired.

In this example embodiment, content of a mail index may include a subject or content digest of a mail. There may be a corresponding relationship between a mail index and a mail. A mail index may be used to point to body content of a mail. When a click event occurs on a mail index, the body content of the mail corresponding to the mail index may be opened. Certainly, a mail index list may alternatively be presented as list information only, and does not have the function of pointing to body content of mails. Mail indexes are arranged together to form a mail index list.

In this example embodiment, mails may be stored locally, so that after a first keyword is acquired, the locally stored mails may be searched to obtain mails that have the first keyword to further obtain a mail index list. Alternatively, mails may be stored in a mail server, and a mail index list acquisition request may be sent to the mail server to obtain a mail index list that is fed back by the mail server. The mail acquisition request may carry an identity identifier of the current user and a first keyword, so that the mail server may determine a target email box according to the identity identifier, search mails of the target email box for the first keyword, and then return a mail index list that has the first keyword.

The mails in the mail index list may be mails of which the subject contains the first keyword, or mails of which the body contains the first keyword, or mails of which the sender, recipient, date of sending or date of reception contains the first keyword.

At 106, at least one mail index is determined from the mail index list.

In this example embodiment, after the mail index list is acquired, the mail index list may be presented to the user through a user interface to receive an instruction from the user to determine at least one mail. Specifically, for example, it is determined whether a mail index is selected from the mail index list by detecting a click event on the mail index list, and when a completion instruction is received, the selected mail may be used as a determined mail. Alternatively, when a click event occurs on the mail index list, the clicked mail may be used as a determined mail.

In this example embodiment, when selecting a mail, the current user may determine, according to the mail index of each mail presented in the mail index list, whether the mail is a mail to be sent. In addition, the current user may alternatively select one mail index, and further browse the body of the mail to accurately determine whether the mail is a mail to be sent, thereby avoiding sending a wrong mail. For example, a function that is to be enabled when a click event occurs on a mail index may be determined depending on different click events. For example, when a click event occurs on a mail index, it indicates that the mail index is selected; when a double-click event occurs on the mail index, it indicates the body of the mail corresponding to the mail index is opened.

At 108, predetermined information is extracted from one or more mails that correspond to the determined mail index.

In this example embodiment, the predetermined information may serve as content of an instant communication message, for the user on the opposite side to browse or read by clicking. The predetermined information may include one or more of the following information in the mail corresponding to the determined mail index: subject, description content, keyword of description content, mail address, name of sender, name of recipient, date of reception, and date of sending. In addition, in a case where there is a plurality of determined mail indexes, the predetermined information may be presented by using the same number of instant communication messages as that of the determined mail indexes, for the user on the opposite side to browse or read by clicking respectively.

In this example embodiment, methods for extracting predetermined information may include copying, extracting, combining content of a mail, and so on. Specifically, for example, the subject of a mail is copied to form the predetermined information, or the date of sending, date of reception, and keyword of description content of the mail are extracted and combined together to form the predetermined information.

At 110, the predetermined information is encapsulated into an instant communication message.

In this example embodiment, the encapsulating the predetermined information into an instant communication message may include converting the data structure of the predetermined information on the basis of the data structure of the instant communication message, and may further include rendering content of the predetermined information on the basis of the format content of the instant communication message.

In this example embodiment, a mail link address of the mail may further be acquired, and in the process of encapsulating the instant communication message, the link address is added to the instant communication message that is obtained after encapsulation, so that members in the current session may access the mail link address to acquire the original content of the mail.

At 112, the instant communication message is sent to a predetermined communication terminal.

In this example embodiment, the predetermined communication terminal may be an instant communication server, or may be a client terminal that performs instant communication. For example, the purpose of sending an instant communication message to an instant communication server is to send the instant communication message to a corresponding client terminal through the instant communication server, that is, to a client terminal that is interacting with the current user. Sending an instant communication message to a client terminal may be construed as that information exchange is directly performed between client terminals, such as by using the Bluetooth technology to transfer the message. Alternatively, sending an instant communication message to a client terminal may be construed as that the final destination to which the instant communication message is to be sent is a client terminal, wherein an instant communication server may be used for forwarding, that is, the information is sent to the instant communication server first, and then forwarded to the client terminal by the instant communication server.

In this example embodiment, the client terminal may be a smart phone, a computer or a smart wearable device, or may be instant communication software that runs in the above device or a web page having an instant communication capability. In this example embodiment, the instant communication message is sent to the client terminal, so that the client terminal may perform further operations on the basis of the instant communication message. Specifically, for example, the user on the opposite side may touch or click the instant communication message after receiving the instant communication message to check the predetermined information of the mail or access the original content of the mail. In addition, the user on the opposite side may further forward the instant communication message to a third user. If the predetermined information is detailed content of the mail, the user on the opposite side may directly perform a reply or forward operation.

According to the instant communication method that is provided by the example embodiment described above, a user may directly use a client terminal that performs instant communication to initiate a mail retrieval command to acquire a required mail, and then send predetermined information of the mail to a target user by using an instant communication message. In this way, the entire mail sending process is carried out in a session of instant communication, so that the user does not need to log in to a web page mail box or a mail box client terminal and perform complex operations, which makes it convenient for users to communicate with each other, thereby improving user experience.

In one example embodiment, the client terminal that performs instant communication has a session interface, and a predetermined button is provided on the session interface.

The operations at 102 include triggering the predetermined button to acquire the first keyword.

In this example embodiment, the predetermined button may be triggered by the user by performing a touch operation, or may be triggered by the user by performing a mouse clicking operation. Triggering the predetermined button may indicate that the function of acquiring a mail index list needs to be enabled. After the predetermined button is triggered, an identity identifier of the user on the opposite side in the current session may be obtained as the first keyword. Alternatively, an input box may be set, and after the predetermined button is triggered, content entered by the user to the input box is acquired as the first keyword.

In one example embodiment, when the first keyword is an identity identifier, the operations at 102 may include acquiring an identity identifier of at least one opposite side member in a current session. In this example embodiment, the identity identifier may be the name, nickname, or position of the opposite side member, or may be a social relationship with the current user, for example, a relative, a friend, or a teacher. Specifically, for example, when the user on the opposite side includes only one opposite side member, the client terminal that performs instant communication may determine by default that the identity identifier of the user on the opposite side is directly acquired after the current user triggers the predetermined button, and that the current user does not need to perform any other operation. If the user on the opposite side includes a plurality of opposite side members, after the current user triggers the predetermined button, the client terminal that performs instant communication presents, on the current session interface, identity identifiers of a plurality of other users that perform the instant communication with the current user, for the current user to select.

In an example embodiment, when the first keyword is an identity identifier, the operation of acquiring a first keyword may include receiving an identity identifier that is entered, wherein the identity identifier is an identity identifier of a target user. In this example embodiment, the retrieved mail may be a history mail between the current user (in the instant communication session) and a target user, wherein the target user may be a third user other than the current user and the user on the opposite side, and the identity identifier of the target user may be entered by the current user. Certainly, the identity identifier may be the name, nickname, or position of the target user, or may be a social relationship with the current user, for example, a relative, a friend, or a teacher.

In an example embodiment, the operation at 102 includes receiving a first keyword that is entered or specified by a user.

In this example embodiment, the first keyword may be any information that is entered or specified by the current user. For example, the first keyword may be manually entered or selected by the current user. For example, after the current user triggers the predetermined button, the client terminal that performs instant communication provides an input box on the current session interface for the current user to enter the first keyword. Alternatively, the client terminal that performs instant communication presents a plurality of first keywords on the current session interface for the current user to select manually.

It may be appreciated that the above example embodiments to show implementation effect in exemplarily presenting the acquiring of a first keyword. Certainly, the acquiring of a first keyword is not limited to the above examples, and those skilled in the art may also make other modifications under the teaching of the technical essence of the present disclosure, and such modifications shall all fall within the protection scope of the present disclosure as long as the same or similar functions and effects as those in the present disclosure may be achieved.

In an example embodiment, the operations at 104 may include locally searching for mails that have the first keyword.

In this example embodiment, mails may be stored locally, so that the locally stored mails or a mail index list may be searched for mails that have the first keyword to form a mail index list. Specifically, for example, an email box may be logged in to further browse mails at the local end, and by using the actions of logging in to an email box and browsing mails, mails in a mail server may be downloaded to the local end. Alternatively, when a new mail is sent to the email box, the mail is stored in both the local end and a server terminal to avoid loss of the mail. Searching the locally stored mails according to the first keyword to obtain a mail index list enables the client terminal that performs instant communication to quickly form a mail index list, thereby allowing the user to send an instant communication message quickly.

Figure 2:
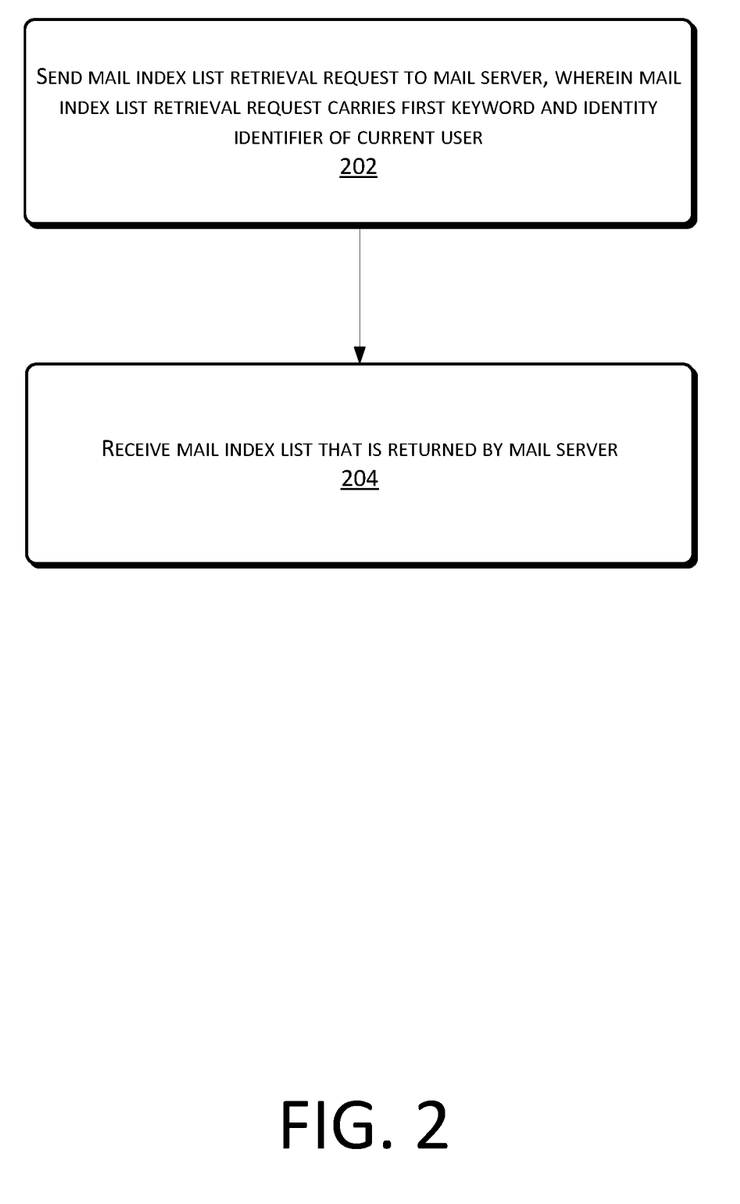
FIG. 2 is a flowchart of an instant communication method according to an example embodiment of the present disclosure.

Referring to FIG. 2, in an example embodiment, the operations at 104 may include the following operations:

At 202, a mail index list retrieval request is sent to a mail server, wherein the mail index list retrieval request carries the first keyword and an identity identifier of a current user.

At 204, a mail index list that is returned by the mail server is received.

In this example embodiment, the mail index list retrieval request may be sent by wireless network transmission or wired network transmission. For example, the mail index list retrieval request is sent via a GPRS network of a mobile phone or the mail index list retrieval request is sent via a wifi network. Correspondingly, the mail index list may be received via a wireless network or a wired network. In addition, the network transmission mode that is used to send the mail index list retrieval request may be the same as or different from that is used to receive the mail index list. For example, the mail index list retrieval request is sent via a GPRS network, and then the mail index list is received via a wifi network.

In this example embodiment, the mail index list retrieval request may be a predetermined character string, which is used to represent that a mail index list needs to be retrieved. The mail index list retrieval request carries the first keyword and the identity identifier, which may be part of content of the mail index list retrieval request; or an attachment to the mail index list retrieval request. Alternatively, one of the first keyword and the identity identifier is part of content of the mail index list retrieval request, and the other is an attachment to the mail index list retrieval request.

In this example embodiment, the mail server receives the mail index list retrieval request, which may indicate that the mail server needs to return a mail index list. The mail server searches the email box corresponding to the identity identifier for mails that have the first keyword, and uses the search result to form a mail index list. Specifically, for example, if the identity identifier is an email box account, the mail server directly finds mails included in the email box according to the email box account. If the identity identifier is not the email box account, the email box account may be found according to the email box account bound with personal information that is set by the user, and further the email box and mails included therein may be found.

It may be appreciated that the implementation of searching local mails to form a mail index list or the implementation of acquiring a mail index list from mail server need not exist alone. In the step of acquiring a mail index list, the client terminal that performs instant communication may perform one of the two implementations, or the client terminal that performs instant communication may perform both the two implementations to obtain a more comprehensive mail index list, thereby avoiding the situation in which the mail to be sent by the current user may not be found by search. Certainly, the two implementations performed by the client terminal that performs instant communication are not limited to any particular order.

Figure 3:
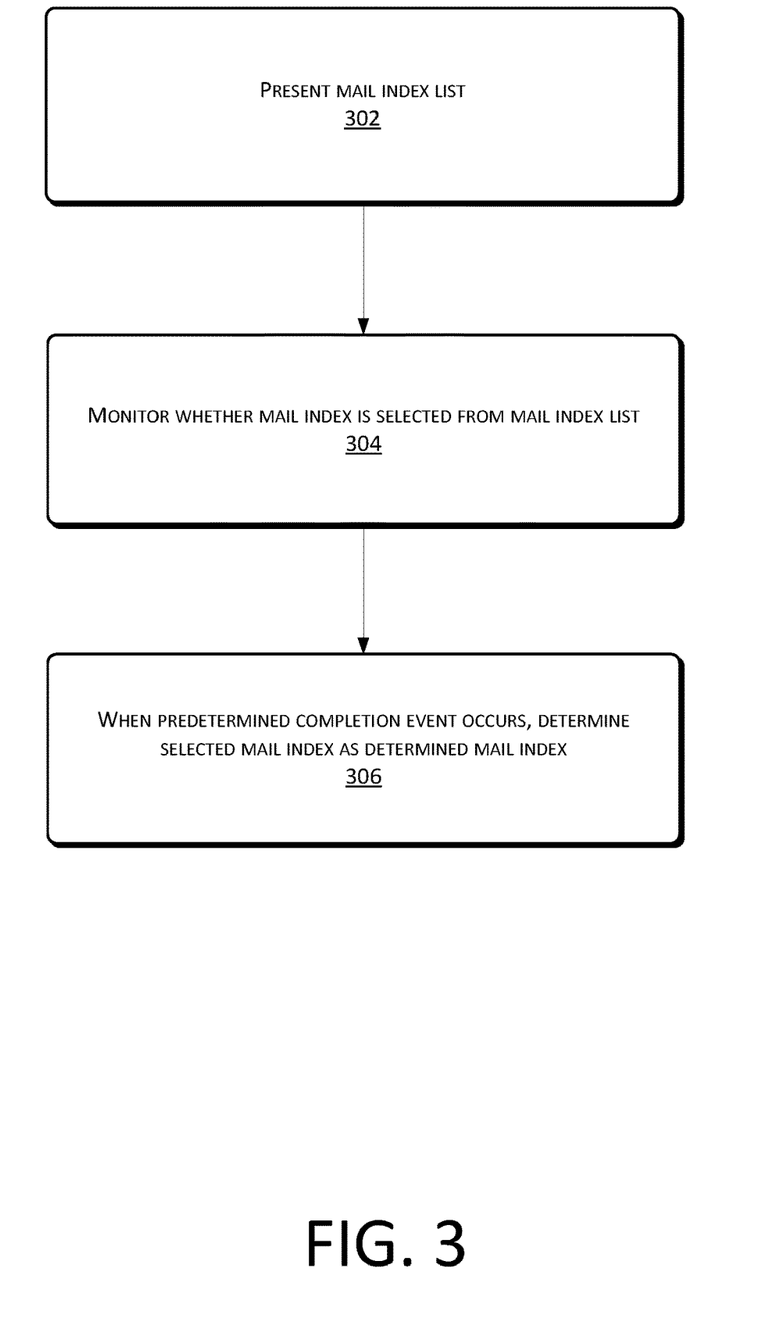
FIG. 3 is a flowchart of an instant communication method according to an example embodiment of the present disclosure.

Referring to FIG. 3, in an example embodiment, the operations at 106 may include the following sub-operations:

At 302, the mail index list is presented.

At 304, whether a mail index is selected from the mail index list is monitored.

At 306, when a predetermined completion event occurs, the selected mail index is determined as a determined mail index.

In this example embodiment, the client terminal that performs instant communication may open a secondary window in the current session window to present the mail index list. The mail index list may be presented in the form of information such as the subjects, content keywords, sending and receiving time of mails, and the current user browses the presentation content of each mail to determine whether the mail is a mail to be sent. To reduce the probability of sending a wrong mail, the current user may further select a mail from the mail index list and read detailed content to accurately determine whether the mail is a mail to be sent.

In this example embodiment, monitoring whether a mail is selected may include monitoring whether a click event occurs on the mail index list. If a click event occurs on a mail, it may be construed as that the mail is selected. Certainly, when the mail index list is presented, a check box may be provided for each mail. When a click event occurs on the check box, it indicates that the check box is selected, and further indicates that the mail corresponding to the check box is selected. For example, the click event may include a mouse clicking event and a touchscreen touch event.

In this example embodiment, the predetermined completion event may be used to represent that mail selection has been completed. Specifically, for example, a completion button may be provided on the user interface, and the predetermined completion event may be an event of triggering the completion button. When the completion button is triggered, it indicates that the user has completed mail selection, and the currently selected mail is a mail that is determined to be sent by using an instant communication message. Certainly, the predetermined completion event and the detection that a mail is selected from the mail index list may occur at the same time. That is, when a click event occurs on a mail in the mail index list, it indicates that the mail is selected, and at the same time the click event may be the predetermined completion event. In this case, the mail on which the click event occurs is a determined mail.

Figure 4:
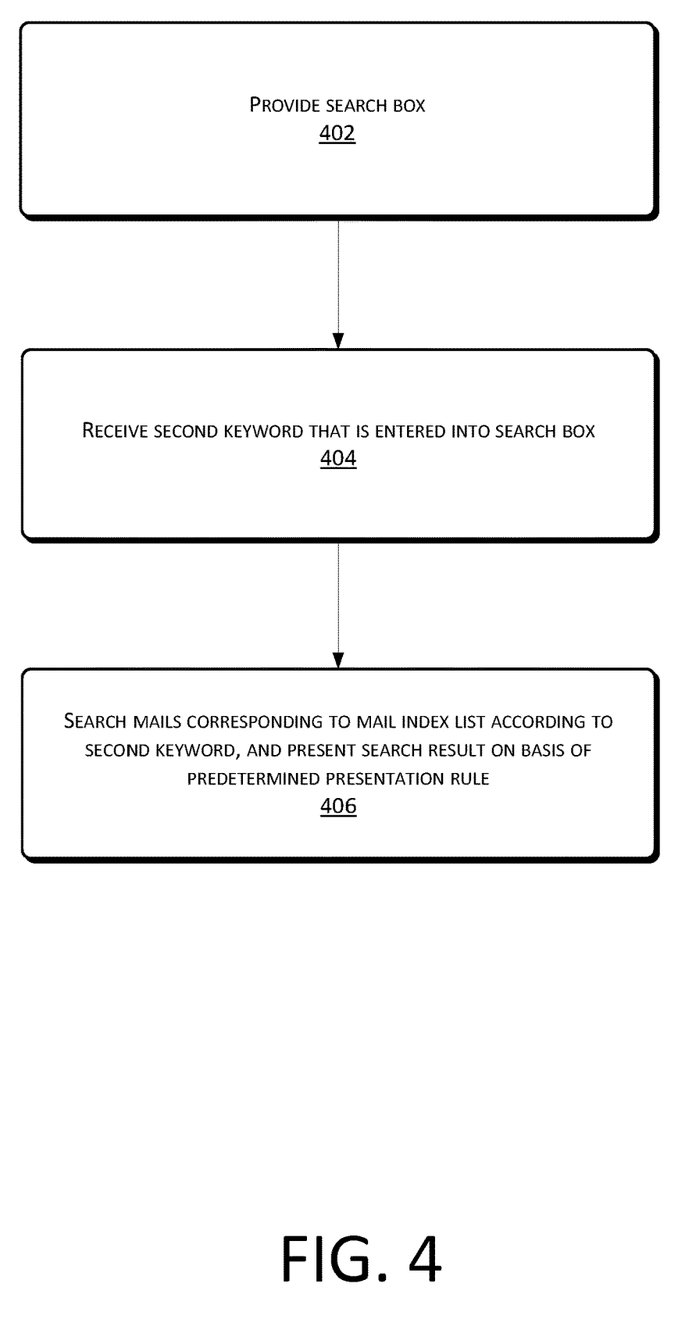
FIG. 4 is a flowchart of an instant communication method according to an example embodiment of the present disclosure.

Referring to FIG. 4, in one example embodiment, the instant communication method may further include the following steps:

At 402, a search box is provided.

At 404, a second keyword that is entered into the search box is received.

At 406, mails corresponding to the mail index list are searched according to the second keyword, and a search result is presented on the basis of a predetermined presentation rule.

In this example embodiment, a search box may be further provided on the interface for presenting the mail index list to further search the mails corresponding to the mail index list for mails that have the second keyword. The search box may be provided while the mail index list is being presented. Alternatively, the search box may be provided when a search function is triggered after the mail index list is presented.

In this example embodiment, the search box allows the current user to enter the second keyword, and may be presented on the same interface as the mail index list. The search box may be in various shapes, for example, rectangular or diamond-shaped. In this example embodiment, the search box is rectangular.

In this example embodiment, the second keyword may be any information that is entered by the current user. The second keyword may be a single term or multiple terms, and certainly, may alternatively be a phrase or long sentence, and the present disclosure is not limited thereto. When the second keyword is multiple terms, neighboring two terms may be spaced from each other by a space or comma for distinguishing.

In this example embodiment, the mail subject provided in the mail index list may be searched for the second keyword, or the entire mail content that includes the subject and the body part may be searched for the second keyword. The predetermined presentation rule may include rendering the second keyword in the mail subject, for example, highlighting the second keyword, bolding the second keyword, italicizing the second keyword, or changing the color of the second keyword; or may be sorting the mail index list on the basis of the number of times that the second keyword appears in a mail. For example, the mail corresponding to the greatest number of times of appearance of the second keyword is placed at the top of the mail index list. This makes it convenient for the user to search mails, thereby facilitating the operation.

In an example embodiment, the predetermined presentation rule may include highlighting the second keyword in the mails; presenting only the mails that have the second keyword; or sorting the mail index list on the basis of the number of times that the second keyword appears in a mail. Specifically, for example, the second keyword in the mail may be rendered. For example, the second keyword in the mail index, the mail subject, and the mail content may be highlighted, bolded, italicized, or changed in color. Alternatively, mails that do not have the second keyword may be filtered out and only mail indexes corresponding to mails that have the second keyword are presented in the form of a list. Alternatively, the mail index list may be sorted on the basis of the number of times that the second keyword appears in a mail, wherein the mail index of the mail corresponding to the greatest number of times of appearance of the second keyword is placed at the top of the mail index list. Certainly, the above multiple implementations may be used in combination. For example, only mail indexes corresponding to mails that have the keyword are displayed, and the second keyword is highlighted. Alternatively, only mail indexes corresponding to mails that have the second keyword are displayed, and are sorted on the basis of the number of times that the second keyword appears in a mail. Alternatively, the mail index list is sorted on the basis of the number of times that the second keyword appears in a mail, and the second keyword is highlighted. Alternatively, all the three implementations may be combined.

Certainly, the predetermined presentation rule is not limited to the above examples, and those skilled in the art may also make other modifications under the teaching of the technical essence of the present disclosure, and such modifications shall all fall within the protection scope of the present disclosure as long as the same or similar functions and effects as those in the present disclosure may be achieved.

In an example embodiment, the operations at 110 may include encapsulating the predetermined message into an instant communication message that carries a mail link address of the determined mail.

In this example embodiment, when the user on the opposite side clicks the instant communication message, the mail link address may be triggered. The mail server may create a mail link address for accessing the determined mail, and provides the mail link address to the client terminal. When encapsulating an instant communication message, the client terminal may encapsulate the mail link address and the predetermined message into an instant communication message. Certainly, alternatively, an instant communication server may acquire a determined mail from a mail server, and provides a mail link address for accessing the determined mail to the client terminal.

In an example embodiment, the operations at 108 may include extracting detailed content of the mail corresponding to the determined mail index as the predetermined information.

In this example embodiment, the detailed content of the determined mail may be the body part of the determined mail, and certainly may further carry other information such as the subject, name of recipient, and name of sender of the determined mail. In this way, when reading the instant communication message, the user on the opposite side will feel as if he/she is reading the original mail in a more convenient and quicker way.

In an example embodiment, the operations at 110 may include encapsulating the predetermined information into an instant communication message that has an action button, wherein the action button includes a browse button, a forward button, and a reply button.

In this example embodiment, after the action button is triggered, a forward operation and a reply operation may be provided for the user to optimize operation experience of the user. By using the forward button, the user may conveniently forward the content of the instant communication message to a third party; by using the reply button, the user may directly call the mail service and reply the determined mail with a mail. In addition, after the instant communication message is sent to the user on the opposite side, both the current user and the user on the opposite side may perform operations on the instant communication message. The action button may be concealed in a secondary menu of the instant communication message, and is displayed when the user touches or clicks it.

In a specific application scenario, the current user and the target user are chatting with each other by using instant communication software such as mobile-phone version or computer version of AliWangWang or DingTalk. When the current user needs to send a required mail to the target user, the current user may initiate a mail retrieval command on a session interface by using the instant communication software, and designate the first keyword. Then the current user determines a mail to be sent from a mail index list that is returned by the instant communication software, and the instant communication software extracts predetermined information of the determined mail, encapsulates the predetermined information into an instant communication message and sends the instant communication message to the target user. As shown, in the entire process, the current user does not need to perform too many operations but only needs to initiate the mail retrieval command, designate the first keyword and determine the mail to be sent; therefore, the user does not need to log in to a web page mail box or a mail box client terminal, thereby greatly facilitating user operations. In addition, the instant communication software may determine by default that the first keyword is the identity identifier of the user on the opposite side that communicates with the current user, which further simplifies user operations, thereby improving operation experience of the user.

Figure 5:
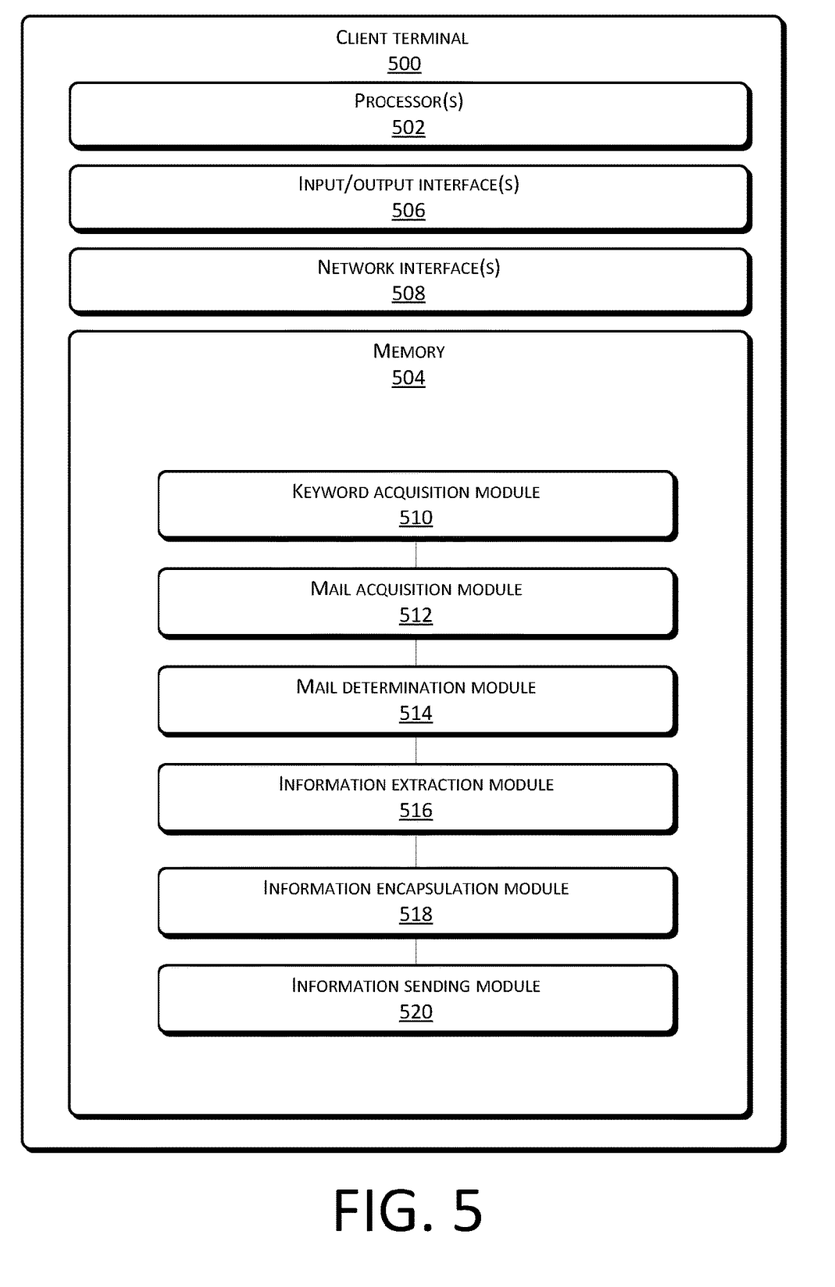
FIG. 5 is a block diagram of a client terminal according to an example embodiment of the present disclosure.

Referring to FIG. 5, one example embodiment of the present disclosure further provides a client terminal 500 which includes one or more processor(s) 502 or data processing unit(s) and memory 504. The client terminal 500 may further include one or more input/output interface(s) 506, and network interface(s) 508. The memory 504 is an example of computer-readable media.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 504 may store therein a plurality of modules or units including a keyword acquisition module 510, a mail acquisition module 512, a mail determination module 514, an information extraction module 516, an information encapsulation module 518, and an information sending module 520.

The keyword acquisition module 510 acquires a keyword.

In this example embodiment, when performing instant communication, the client terminal 500 may establish a session interface to start instant information interaction. That is, instant communication messages of a current user and a user on the opposite side may be presented on the session interface. The keyword acquisition module 510 may set a predetermined button on the session interface, and when it is detected that a click event occurs on the predetermined button, the click event is used as a start event for acquiring a first keyword. To improve user experience during conversation, the predetermined button may be set in a secondary menu of the session interface, and may be invoked by the user when needing to introduce a mail. Specifically, for example, a secondary menu opening button is provided on the session interface of the client terminal 500, and when the user touches or clicks the secondary menu opening button, the secondary menu is opened to present the predetermined button, so that the user may perform an operation of triggering the predetermined button.

In this example embodiment, the first keyword may be an identity identifier or any information that is set by the current user. For example, the first keyword may be a keyword of content of the mail to be sent, the date of reception of the mail or the like, and the present disclosure is not limited thereto. Certainly, the first keyword may be manually entered or selected by the current user. For example, after the current user triggers the predetermined button, the client terminal that performs instant communication provides an input box on the current session interface for the current user to enter the first keyword. Alternatively, the client terminal that performs instant communication presents a plurality of first keywords on the current session interface for the current user to select manually. Alternatively, an identity identifier of an opposite side member in a current session may be directly used as the first keyword.

The mail acquisition module 512 acquires a mail index list of mails that contain the first keyword.

In this example embodiment, content of a mail index may include a subject or content digest of a mail. There may be a corresponding relationship between a mail index and a mail. A mail index may be used to point to body content of a mail. When a click event occurs on a mail index, the body content of the mail corresponding to the mail index may be opened. Certainly, a mail index list may alternatively be presented as list information only, and may do not have the function of pointing to body content of mails. Mail indexes are arranged together to form a mail index list.

In this example embodiment, mails may be stored locally in the client terminal 500, so that after a first keyword is acquired, the locally stored mails may be searched to obtain mails that have the first keyword to further obtain a mail index list. Alternatively, mails may be stored in a mail server, and a mail index list acquisition request may be sent to the mail server to obtain a mail index list that is fed back by the mail server. The mail acquisition request may carry an identity identifier of the current user and a first keyword, so that the mail server may determine a target email box according to the identity identifier, search mails of the target email box for the first keyword, and then return a mail index list that has the first keyword.

The mails in the mail index list may be mails of which the subject contains the first keyword, or mails of which the body contains the first keyword, or mails of which the sender, recipient, date of sending or date of reception contains the first keyword.

The mail determination module 514 determines at least one mail index from the mail index list.

In this example embodiment, after acquiring the mail index list, the client terminal 500 may present the mail index list to the user through a user interface to receive an instruction from the user to determine at least one mail. Specifically, for example, it is determined whether a mail index is selected from the mail index list by detecting a click event on the mail index list, and when a completion instruction is received, the selected mail may be used as a determined mail. Alternatively, when a click event occurs on the mail index list, the clicked mail may be used as a determined mail.

In this example embodiment, when selecting a mail, the current user may determine, according to the mail index of each mail presented in the mail index list, whether the mail is a mail to be sent. In addition, the current user may alternatively select one mail index, and further browse the body of the mail to accurately determine whether the mail is a mail to be sent, thereby avoiding sending a wrong mail. For example, a function that is to be enabled when a click event occurs on a mail index may be determined depending on different click events. For example, when a click event occurs on a mail index, it indicates that the mail index is selected; when a double-click event occurs on the mail index, it indicates the body of the mail corresponding to the mail index is opened.

The information extraction module 516 extracts predetermined information from one or more mails that corresponds to the determined mail index.

In this example embodiment, the predetermined information may serve as content of an instant communication message, for the user on the opposite side to browse or read by clicking. The predetermined information may include one or more of the following information in the mail corresponding to the determined mail index: subject, description content, keyword of description content, mail address, name of sender, name of recipient, date of reception, and date of sending. In addition, in a case where there is a plurality of determined mail indexes, the predetermined information may be presented by using the same number of instant communication messages as that of the determined mail indexes, for the user on the opposite side to browse or read by clicking respectively.

In this example embodiment, methods for extracting predetermined information may include copying, extracting, combining content of a mail, and so on. Specifically, for example, the subject of a mail is copied to form the predetermined information, or the date of sending, date of reception, and keyword of description content of the mail are extracted and combined together to form the predetermined information.

The information encapsulation module 518 encapsulates the predetermined information into an instant communication message.

In this example embodiment, the encapsulating the predetermined information into an instant communication message may include converting the data structure of the predetermined information on the basis of the data structure of the instant communication message, and may further include rendering content of the predetermined information on the basis of the format content of the instant communication message.

In this example embodiment, a mail link address of the mail may further be acquired, and in the process of encapsulating the instant communication message, the link address is added to the instant communication message that is obtained after encapsulation, so that members in the current session may access the mail link address to acquire the original content of the mail.

The information sending module 520 sends the instant communication message to a predetermined communication terminal.

In this example embodiment, the predetermined communication terminal may be an instant communication server, or may be a client terminal that performs instant communication. For example, the purpose of sending an instant communication message to an instant communication server is to send the instant communication message to a corresponding client terminal through the instant communication server, that is, to a client terminal that is interacting with the current user. Sending an instant communication message to a client terminal may be construed as that information exchange is directly performed between client terminals, for example, by using the Bluetooth technology to transfer information; or may be construed as that the final destination to which the instant communication message is to be sent is a client terminal, wherein an instant communication server may be used for forwarding. That is, information is sent to the instant communication server first, and then forwarded to the client terminal by the instant communication server.

In this example embodiment, the client terminal may be a smart phone, a computer or a smart wearable device, or may be instant communication software that runs in the above device or a web page having an instant communication capability. In this example embodiment, the instant communication message is sent to the client terminal, so that the client terminal may perform further operations on the basis of the instant communication message. Specifically, for example, the user on the opposite side may touch or click the instant communication message after receiving the instant communication message to check the predetermined information of the mail or access the original content of the mail. In addition, the user on the opposite side may further forward the instant communication message to a third user. If the predetermined information is detailed content of the mail, the user on the opposite side may directly perform a reply or forward operation.

According to the instant communication method and the client terminal that are provided by the example embodiments described above, a user may directly use a client terminal that performs instant communication to initiate a mail retrieval command to acquire a required mail, and then send predetermined information of the mail to a target user by using an instant communication message. In this way, the entire mail sending process is carried out in a session of instant communication, so that the user does not need to log in to a web page mail box or a mail box client terminal and perform complex operations, which makes it convenient for users to communicate with each other, thereby improving user experience.

Multiple example embodiments have been described in the present disclosure, and it should be understood by those skilled in the art that the example embodiments of the present disclosure may be combined with or referenced to each other. In addition, those skilled in the art shall know that various modifications and variations may be made to the present disclosure without departing from the spirit of the present disclosure, and it is intended that the appended claims encompass these modifications and variations without departing from the spirit of the present disclosure.

What is claimed is:

1. A method comprising:
    acquiring, by a client terminal, a first keyword;
    acquiring a mail index list of mails that contain the first keyword;
    determining at least one mail index from the mail index list based on an instruction from a user;
    extracting predetermined information from one or more mails that corresponds to the at least one mail index;
    encapsulating the predetermined information and a mail link address of the one or more mails into an instant communication message that has an action button, the mail link address of the one or more mails corresponding to the at least one mail index, the action button being concealed in a secondary menu of the instant communication message, the action button being configured to be displayed when the secondary menu is triggered, the action button including a reply button, the reply button being configured to directly call mail service and reply to a determined mail with a responding mail, the determined mail being a mail selected by the user; and
    sending, by the client terminal, the encapsulated instant communication message with the predetermined information, the mail link address of the one or more mails, and the action button to a communication terminal.

2. The method of claim 1, wherein the communication terminal is predetermined.

3. The method of claim 1, wherein:
the client terminal has a session interface; and
a predetermined button is provided on the session interface.

4. The method of claim 3, wherein the acquiring the first keyword includes acquiring the first keyword when the predetermined button is triggered.

5. The method of claim 1, wherein the first keyword is an identity identifier.

6. The method of claim 5, wherein the acquiring the first keyword includes acquiring an identity identifier of at least one opposite side member in a current session.

7. The method of claim 5, wherein the acquiring the first keyword includes receiving an identity identifier of a target user.

8. The method of claim 1, wherein the acquiring the first keyword includes receiving the first keyword that is entered or specified by a user through a user interface.

9. The method of claim 1, wherein the acquiring the mail index list includes locally searching for mails that have the first keyword to form the mail index list.

10. The method of claim 1, wherein the acquiring the mail index list includes:
sending a mail index list retrieval request to a mail server, wherein the mail index list retrieval request carries the first keyword and an identity identifier of a current user; and
receiving the mail index list that is returned by the mail server.

11. The method of claim 1, wherein the determining at least one mail index includes:
presenting the mail index list;
monitoring whether a mail index is selected from the mail index list; and
determining the mail index when a predetermined completion event occurs.

12. The method of claim 1, further comprising:
providing a search box;
receiving a second keyword that is entered into the search box;
searching the mails corresponding to the mail index list according to the second keyword; and
presenting a search result on the basis of a predetermined presentation rule.

13. The method of claim 12, wherein the presenting the search result includes:
highlighting the second keyword in the mails;
presenting the mails that have the second keyword; or
sorting the mail index list on the basis of the number of times that the second keyword appears in a mail.

14. The method of claim 1, wherein the predetermined information includes one or more of the following information in the one or more mails:
a subject;
a description content;
a keyword of description content;
a mail address;
a name of sender;
a name of recipient;
a date of reception, and
a date of sending.

15. The method of claim 1, wherein the extracting the predetermined information includes extracting detailed content of the one or more mails corresponding to the at least one mail index as the predetermined information.

16. A client terminal comprising:
one or more processors;
a memory coupled to the one or more processors, the memory storing a plurality of executable modules, executable by the one or more processors, the plurality of modules including
a keyword acquisition module that acquires a first keyword;
a mail acquisition module that acquires a mail index list of mails that contain the first keyword;
a mail determination module that determines at least one mail index from the mail index list based on an instruction from a user;
an information extraction module that extracts predetermined information from one or more mails that corresponds to the at least one mail index;
an information encapsulation module that encapsulates the predetermined information and a mail link address of the one or more mails into an instant communication message that has an action button, the mail link address of the one or more mails corresponding to the at least one mail index, the action button being concealed in a secondary menu of the instant communication message, the action button being configured to be displayed when the secondary menu is triggered, the action button including a reply button, the reply button being configured to directly call mail service and reply to a mail with a responding mail, the mail being a mail selected by the user; and
an information sending module that sends the encapsulated instant communication message with the predetermined information, the mail link address of the one or more mails, and the action button to a predetermined communication terminal.

17. One or more memories stored thereon computer-executable instructions, executable by one or more processors, to cause the one or more processors to perform acts comprising:
acquiring, by a client terminal, a first keyword;
acquiring a mail index list of mails that contain the first keyword;
determining at least one mail index from the mail index list based on an instruction from a user;
extracting predetermined information from one or more mails that corresponds to the at least one mail index;
encapsulating the predetermined information and a mail link address of the one or more mails into an instant communication message that has an action button, the mail link address of the one or more mails corresponding to the at least one mail index, the action button being concealed in a secondary menu of the instant communication message, the action button being configured to be displayed when the secondary menu is triggered, the action button including a reply button, the reply button being configured to directly call mail service and reply to a mail with a responding mail, the mail being a mail selected by the user; and
sending the encapsulated instant communication message with the predetermined information, the mail link address of the one or more mails to a communication terminal.

18. The one or more memories of claim 17, wherein:
the client terminal has a session interface; and
a predetermined button is provided on the session interface.

19. The one or more memories of claim 18, wherein the acquiring the first keyword includes acquiring the first keyword when the predetermined button is triggered.

20. The one or more memories of claim 18, wherein the first keyword is an identity identifier.

\* \* \* \* \*